(12) United States Patent
Uva

(10) Patent No.: US 12,182,748 B2
(45) Date of Patent: *Dec. 31, 2024

(54) APPARATUS AND METHODS FOR GENERATING A PROCESS ENHANCEMENT

(71) Applicant: UVA IP, LLC, Miami, FL (US)

(72) Inventor: Luis Uva, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,888

(22) Filed: Dec. 27, 2023

(65) Prior Publication Data

US 2024/0394632 A1 Nov. 28, 2024

Related U.S. Application Data

(63) Continuation of application No. 18/202,677, filed on May 26, 2023, now Pat. No. 11,907,881.

(51) Int. Cl.
 *G06Q 10/0633* (2023.01)
 *G06N 3/048* (2023.01)

(52) U.S. Cl.
 CPC ......... *G06Q 10/0633* (2013.01); *G06N 3/048* (2023.01)

(58) Field of Classification Search
 CPC ........... G06Q 10/00–50/00; G06N 3/00–20/00
 USPC .............................................. 705/7.11–7.42
 See application file for complete search history.

(56) References Cited

U.S. PATENT DOCUMENTS

| | | | |
|---|---|---|---|
| 8,121,853 B2 | 2/2012 | Cates | |
| 8,615,514 B1* | 12/2013 | Fernandes | G06F 16/958 707/728 |
| 8,924,942 B1* | 12/2014 | Makuch | G06F 3/00 717/125 |
| 10,510,088 B2* | 12/2019 | Jones-McFadden | G06N 20/00 |
| 2003/0009555 A1* | 1/2003 | Nickerson | G06Q 30/0242 709/224 |
| 2004/0019688 A1* | 1/2004 | Nickerson | G06Q 30/02 709/224 |
| 2004/0172323 A1* | 9/2004 | Stamm | G06Q 10/06393 705/7.32 |
| 2008/0133500 A1* | 6/2008 | Edwards | G06F 16/958 707/999.005 |
| 2015/0046841 A1* | 2/2015 | Sharon | G06F 15/17306 715/753 |
| 2015/0095756 A1* | 4/2015 | Aganovic | G06F 40/131 715/234 |

(Continued)

*Primary Examiner* — Alan S Miller
(74) *Attorney, Agent, or Firm* — Caldwell Intellectual Property Law

(57) ABSTRACT

An apparatus and method for generating a process enhancement, the apparatus comprising a memory and a processor configured to receive process data, receive user input, determine a plurality of response modules as a function of the user input, determine a modification target as function of the plurality of response modules, wherein determining the modification target includes calculating an importance score for each response module of the plurality of response modules, ranking each response module of the plurality of response modules as a function of the importance score and determining the modification target as a function of the ranking, identify at least a process modification as a function of the process data and the modification target and generate the process enhancement as a function of the at least a process modification.

20 Claims, 11 Drawing Sheets

(56) References Cited

U.S. PATENT DOCUMENTS

| | | | |
|---|---|---|---|
| 2016/0055132 A1* | 2/2016 | Garrison | G06F 16/958 |
| | | | 706/12 |
| 2016/0196522 A1 | 7/2016 | Niu | |
| 2016/0267422 A1 | 9/2016 | Kothadiya | |
| 2017/0017760 A1* | 1/2017 | Freese | G16H 40/63 |
| 2017/0236131 A1* | 8/2017 | Nathenson | G06Q 30/0201 |
| | | | 705/26.7 |
| 2020/0185096 A1* | 6/2020 | Bantilan | H04L 67/535 |
| 2022/0277322 A1 | 9/2022 | Tanaka | |
| 2023/0058543 A1* | 2/2023 | Graf | G06Q 30/0203 |
| 2023/0206096 A1* | 6/2023 | Paiement | G06N 3/08 |
| | | | 706/52 |

* cited by examiner

APPARATUS AND METHODS FOR GENERATING A PROCESS ENHANCEMENT

CROSS-REFERENCE TO RELATED APPLICATIONS

This application is a continuation of Non-provisional application Ser. No. 18/202,677 filed on May 26, 2023, and entitled "APPARATUS AND METHODS FOR GENERATING A PROCESS ENHANCEMENT," which is incorporated herein by reference in its entirety.

FIELD OF THE INVENTION

The present invention generally relates to the field of machine learning. In particular, the present invention is directed to an apparatus and method for generating a process enhancement.

BACKGROUND

Feedback from users of a product are often sought out, but in many cases no change occur from that feedback. A system for improving that product or service based on feedback is desirable.

SUMMARY OF THE DISCLOSURE

In an aspect, an apparatus for generating a process enhancement includes at least a processor and a memory communicatively connected to the at least a processor, wherein the memory contains instructions configuring the at least a processor to receive process data, receive user input, determine a plurality of response modules as a function of the user input, determine a modification target as function of the plurality of response modules, identify at least a process modification as a function of the process data and the modification target, and generate a process enhancement as a function of the at least a process modification, wherein generating the process enhancement further includes generating enhancement training data, training an enhancement machine learning model using the enhancement training data, generating an additional process modification using the enhancement machine learning model, and generating the process enhancement as a function of the at least a process modification and the additional process modification.

In another aspect a method for generating a resolution enhancement plan includes receiving, by at least a processor, process data, receiving, by the at least a processor, user input, determining, by the at least a processor, a plurality of response modules as a function of the user input, determining, by the at least a processor, a plurality of response modules as a function of the user input, determining, by the at least a processor, a modification target as function of the plurality of response modules, identifying, by the at least a processor, at least a process modification as a function of the process data and the modification target, and generating, by the at least a processor, a process enhancement as a function of the at least a process modification, wherein generating the process enhancement further includes generating enhancement training data, training an enhancement machine learning model using the enhancement training data, generating an additional process modification using the enhancement machine learning model, and generating the process enhancement as a function of the at least a process modification and the additional process modification.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for generating a process enhancement. In an embodiment, generating a process enhancement may include receiving input through the use of a chatbot.

Aspects of the present disclosure allow for automated process enhancement guidance through the use of machine learning models. Exemplary embodiments illustrating aspects of the present disclosure are described below in the context of several specific examples.

Figure 1:
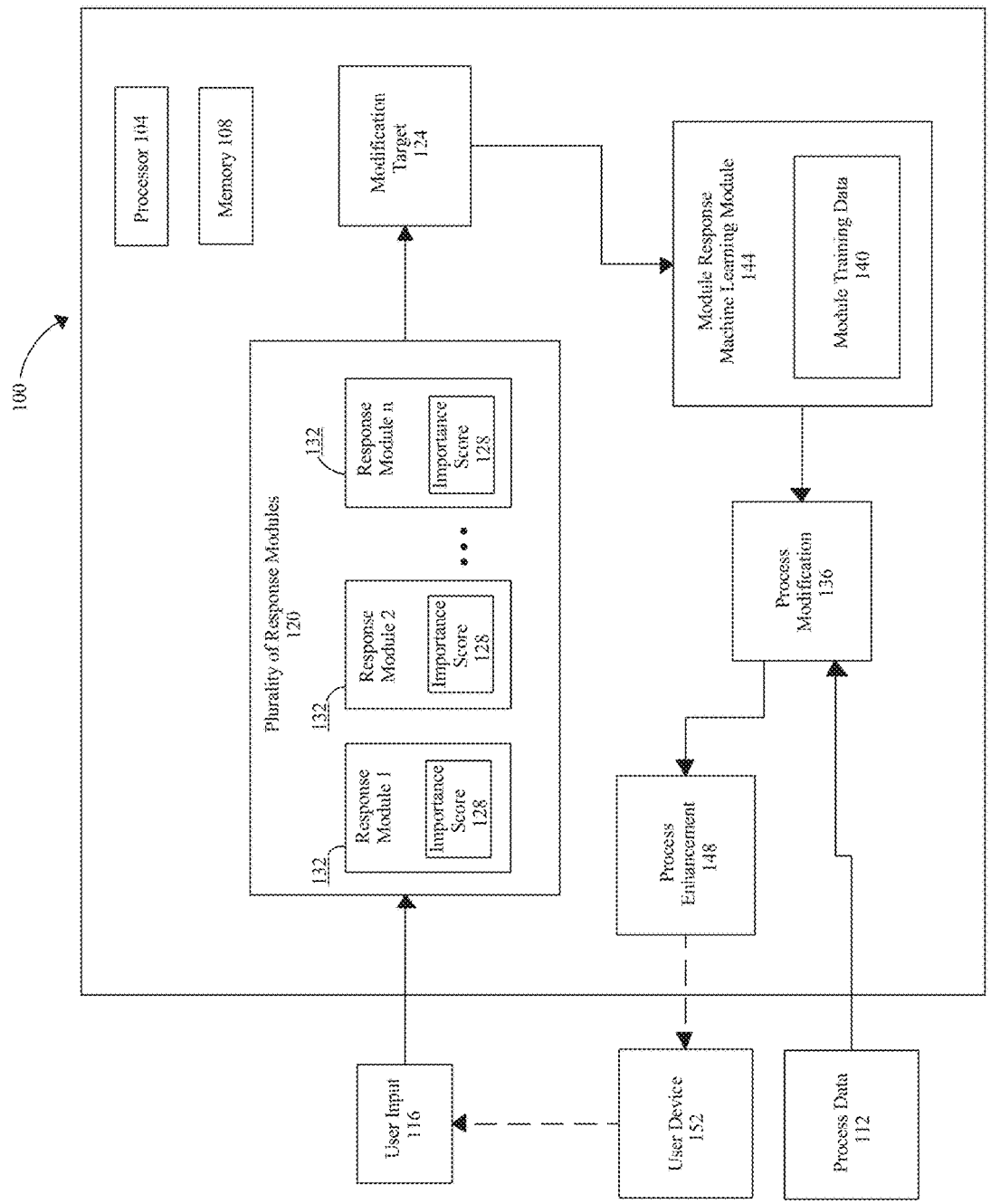
FIG. 1 is a block diagram of an exemplary embodiment of an apparatus for generating a process enhancement.

Referring now to FIG. 1, an exemplary embodiment of an apparatus 100 for generating a process enhancement is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 includes a memory 108 communicatively connected to the at least a processor 104, wherein the memory 108 contains instructions configuring processor 104 to perform tasks in accordance with this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in an embodiment, processor 104 is configured to receive process data 112. As used herein, "process data" is a data structure representing a set of steps to achieve an end result. In a nonlimiting example, process data 112 may be a set of steps taken by a user on a website to order a part, from inventory selection to payment. Process data 112 may be included in a database. Process data may be included in any data store. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in an embodiment, processor 104 is configured to receive user input data 116. As used herein, "user input data" is an input submitted by a user. In embodiments, user input data 116 may include information related to sections, subsections and criteria of process data 112. In an example, without limitation, a section may be a checkout process of a website, a subsection may include product selection or payment method and aspect may include a source of a user satisfaction or dissatisfaction with a section/subsection, such as easy-of-use, clicks required to complete, overall presentation, and the like. User input data 116 may be submitted through a Graphical User interface (GUI). In a nonlimiting example, user input data 116 may include responses to a questionnaire. In another nonlimiting example, user input data 116 may include user responses to compound questions. As used herein, "compound questions" are questions where the answer applies to the answer to a preceding question, such as a question about the quality of the service provided followed by a question about what section of the process had the highest quality. In embodiments, questions and compound questions may prompt a user to provide information related to sections, subsections and criteria of process data 112. In embodiments, user input 116 may be received through a user interaction with a user interface. In some embodiments, user interface may be a graphical user interface (GUI). User interface may include text fields, checkboxes, radio buttons, drop-down menus, buttons and the like. In embodiments, user interface may include touch-based inputs such as swiping, pinching, pressing and the like. In a nonlimiting example, user response may be by selecting one options from multiple options presented, such as pressing a representation of a "button" on a touchscreen display. A "user," as used herein, is a person, or entity, that utilizes apparatus 100. In further nonlimiting examples, processor 104 may be configured to present a compound question that includes a set of options for the user to select based on a previous selection, such as first presenting user with three options for sections of a website with which user had the worse experience and then present a second set of options with sub-sections of that section for the user to choose. In embodiments, processor 104, using a GUI, may prompt user to select a rating form a section or subsection of a process. Continuing with the above nonlimiting examples, after user selects an option indicative of a subsection, processor 104 may configure a computing device to display, though a GUI, five selectable options corresponding to ratings between 1 and 5, where user may select option corresponding to the desired rate for that sub-section. It will become apparent to one of ordinary skill in the art, upon reading this disclosure, that receiving user input 116 though a user interface are described in exemplary form and that there are many other possible ways to present and receive responses from user, including multiple combinations of user selection of sections, sub-sections and ratings, that are not described herein.

Continue to refer to FIG. 1, in some embodiments, user input data 116 may include responses based on an interaction between a user and a chatbot. As used in the current disclosure, a "chatbot" is a computer program designed to simulate conversation with a user. In a nonlimiting example, chatbot may prompt user to rate a service on a scale of 1 to 5, and subsequently prompt the user to select a section of the process that caused the previously provided rating. In further examples, without limitation, the chatbot may begin receiving user input data 116 by prompting user to input a rating between 1-5 for the user experience aspect of using the checkout process section of a website. Continuing with the nonlimiting example, upon receiving a rating of 3, chatbot may prompt user to input what sub-section of the checkout process contributed the most for the lower than 5 rating. The chatbot may provide the user with a list of options with the prompt. Still on the same nonlimiting example, upon receiving an input of "products page" the chatbot may further prompt user to input an aspect of the products page. The chatbot may provide a list of sub-sections with the prompt. Continuing with the nonlimiting example, upon receiving an input of "product description", apparatus 100 may receive user input data 116 that includes a rating of 3 for product information. In an alternative nonlimiting example, upon receiving a rating of 5 from the user, the chatbot may prompt for a section that contributed the most for the high rating and further prompt for a subsection of that section, in this example the user input data 116 may be a rating of 5 associated with that subsection. In a further nonlimiting example, chatbot may prompt user for a response after user terminates using a section of a website, but while using another section of a website. It will be apparent to one of ordinary skill, upon reading this disclosure, that the use of a chatbot may enable apparatus 100 to continue to gather user input 116 while enabling user to utilize other sections of a process. Chatbot is described in more detail in FIG. 7.

Continuing to refer to FIG. 1, in some embodiments, processor 104 is configured to determine a plurality of response modules 120 as a function of user input 116. A "response module," a used herein, is a data structure representing a set of user responses related to a section and/or subsection of a process. In embodiments, user response may include information related to sections, subsections, criteria with ratings related to sections and/or subsections of a process. In an embodiment, response module 120 may include a number of selections. A "number of selections," as used herein, is a number of times that users have chosen a section, subsection and aspect for feedback. In a nonlimiting example, a response module may include "for main menu section, options subsection and presentation aspect with rating of 3" coupled with a 10, which represents the total amount of times users have selected this combination for rating. In embodiments, user response module 120 may be in textual format responses, numeric responses, categorical responses and the like. In embodiments, user response module 120 may include a combination of a plurality of formats. In some embodiments, user response module 120 may be stored in a database. Textual responses, in embodiments, may include user answers to a chatbot. In a nonlimiting example, chatbot may prompt user for a section, then based on the answer, chatbot may prompt for a subsection and upon receiving an answer chatbot may prompt user for an aspect of subsection and a corresponding rating based on the aspect. In this nonlimiting example, textual response may be "checkout (section), payment (subsection), rating of 3 for ease-of-use (aspect)." In another nonlimiting example, textual response may include a survey filled out by a user on a website. Textual response, in embodiments, may include an aggregation of all responses to compound questions. In embodiments, numeric response may include number of selections. In embodiments, numeric response may be an aspect rating. In some embodiments, numeric response may be indexed in a database based on user interaction with abuse interface. In a nonlimiting example, user may select a choice for section, such as "checkout," a choice for subsection, such as "payment methods," and a choice of aspect, such as "choice of methods," and input a rating of 4. In this nonlimiting example, the rating of 4 is a numeric response, such as an integer, stored in a database and indexed under "Checkout/Payment methods/Choice of payments." In embodiments, numeric responses may be used for aggregating subsections and/or criteria based on number of selections. In embodiments, numerical responses may be used for calculating averages. In a nonlimiting example, numeric responses. In a nonlimiting example, response module 120 may include responses related to an interaction with costumer service by a user when placing an order online.

Still referring to FIG. 1, in some embodiments, response module 120 may include a response timing. A "response timing," as used herein, is a measurement of time between a prompt for a selection and a user selection. In a nonlimiting example, response timing may be a measure of time between a prompt for a section and a user selection, such as clicking a button corresponding to one of the options. In some embodiments, processor 104 may categorize response timing as "fast response," "average response" and "slow response." In some embodiments, processor 104 may categorize response timing using fuzzy set comparison. In an embodiment, processor 104 may assign a rating for each category of response timing. In a nonlimiting example, processor 104 may assign a user rating for each category, such as in a scale of 1-3, a fast response receives a 1, while an average response receives a 2 and a slow response receives a 3, where the slower response indicates that a user has given more thought regarding their response. In some embodiments, response timing may be categorized as "nonresponse," "emotional response" and "intellectual response." A "nonresponse," as used herein, is a response timing below a timing range threshold. An "emotional response," as used herein, is a response timing that is within a timing range threshold. An "intellectual response," as used herein, is a response timing that is above timing range threshold. A "timing range threshold," as used herein, is a range of time that has a lower threshold and an upper threshold of time. In a nonlimiting example, a timing range threshold may be a range between 2 second and 5 seconds to respond to a question prompt. In a further nonlimiting example, a response with a response timing that is below 2 seconds may be labelled as a nonresponse because it indicates that a user clicked on an answer without giving much thought about the answer given. In another nonlimiting example, a response timing of 3 seconds, which is within a timing range threshold of between 2 and 5 seconds, may be labeled as an emotional response as it indicates that a user has fully appreciated the question and answered based on how they feel about the answer. In another nonlimiting example, a response timing of 10 seconds may be labelled as an intellectual response as it indicates that the user has fully appreciated the question but has also allowed outside resources to influence the answer. In an embodiment, processor 104 may be configured to only utilize responses within a specified category of response timing. In a nonlimiting example, processor 104 may only utilize responses with a response timing categorized as emotional response, such as due to their increased accuracy in indicating how a user feels about their answer without being influenced by outside resources. In some embodiments, processor 104 may categorize a response timing using a classifier. Processor 104 may categorize response timing using any methods and/or algorithms described in reference to FIGS. 3-6.

With continued reference to FIG. 1, in an embodiment, processor 104 is configured to determine a modification target 124 as a function of the plurality of response modules 120. A "modification target," as used herein, are data structures representing one or more sections and/or subsections of a process identified to be modified based on a preset modification rule. In an embodiments, modification target 124 may be a value stored in a database or any other type of data storage structures. In an example, modification target 124 may be represented as "section/subsection/criteria." In a nonlimiting example, modification target may be "item descriptions" in "product presentation" of "products" page of a website, which may be stored as "products/product presentation/item descriptions." As used herein, a "modification rule" is a criterion used for determining a section/subsection to be modified. Modification rule for determining modification targets 124 are discussed in more detail below. In some embodiments, modification rule may include a rule, or set of rules, related to only selecting one modification target 124. In embodiments, modification rule may include a rule, or set of rules, related to selecting multiple modification targets 124. In a nonlimiting example, processor 104 may be configured to determine multiple separate sections/subsections as modification targets 124 based on a modification rule that allows for selection of multiples modification targets 124. For example, without limitations, processors 104 may determine all sections/subsections with a user rating of 1 as modification targets 124. In another nonlimiting example, processor 104 may determine all sections/subsections with a user rating of 1 and a number of selections above a set threshold, such as a threshold of 20 selections, as modification targets 124. In another nonlimiting example, processor 104 may determine all sections/subsections with a user rating of 3 or below and a response timing of slow response as modification targets 124.

Continuing to refer to FIG. 1, in some embodiments, processor 104 may be configured to calculate an importance score 128 for each response module 132 of the plurality of response modules 120. An "importance score," as used, is a score associated with the importance of feedback for one section and/or subsection of a process in relation to the feedback for other sections of the process. A combination of a section, a subsection and a criteria used for rating may be referred to as "section/subsection/criteria" throughout this disclosure. In a nonlimiting example, processor 104 may be configured to determine a modification target 124 based on a modification rule related to selecting the response module 132 with the highest importance score 128. In an embodiment, importance score 128 may be determined based on user ratings for a section/subsection/criteria. In a nonlimiting example, all response modules 132 that include a user rating of 1 may receive the highest importance scores 128. In embodiments, importance score 128 may be determined based on number of selections. In some embodiments, importance score 128 may be further calculated based a priority. A priority may include a section priority, a subsection priority and a criteria priority. A "section priority," as used herein, is a priority set for one or more sections over other sections of process. In a nonlimiting example, processor 104 may set a "checkout" section above a "customer support" section as shortcomings, or failures, in the checkout section may have a higher impact on the business than poor experiences by customers when interacting with customer support. In embodiments, section priority may further include subsection priority. A "subsection priority," as used herein, is a priority set for subsections within a section. In embodiments, subsection priority may be used for further identifying a subsection of a section to be determined as modification target 124. In a further nonlimiting example, once a "checkout" section is selected, processor 104 may set a subsection for "billing information" as higher subsection priority over "shopping cart" subsection as incorrect billing information may have a higher impact on the business than incorrect items being displayed to the user under the shopping cart subsection. In some embodiments, subsection priority may further include a criteria priority. In embodiments, criteria priority may be used for further identifying criteria of a subsection of a section to be determined as modification target 124. In a further nonlimiting example, once a "billing information" subsection of a "checkout" section is selected, processor 104 may set a criteria priority of "accuracy" as higher criteria priority over "ease of use" as inaccurate billing information may have a higher impact on the business than the overall interface presented to the user for inputting billing information. In this nonlimiting example, a response module 132 that includes a user rating of 1 for "checkout/billing information/accuracy" may have a higher importance score 128 than a response module 132 that includes a user rating of 1 for "customer support/chat function/customer satisfaction." In some embodiments, modification rule may include rules related to section priority, subsection priority and/or criteria priority. In a nonlimiting example, processor 104 may determine modification targets 124 based on a modification rule selecting all response modules 132 with section/subsection with a user rating of 1 and a section marked as "high priority." In another nonlimiting example, processor 104 may determine modification targets 124 based on a modification rule selecting all response modules 132 with section/subsection with a user rating below 4 and a "slow response" response timing. It will become apparent to one of ordinary skill in the art, upon reading this disclosure, that importance scores 128 may be calculated based on a combination of multiple parameters such as user ratings, section/subsection/criteria priorities, response timing and number of selections, where a person or entity may set the rules of importance related to each parameter for calculating the scores.

Still referring to FIG. 1, in some embodiments, calculating an importance score 128 may include minimizing an objective function. An "objective function" as used in this disclosure, is a mathematical function with a solution set including a plurality of data elements to be compared, such as without limitation user ratings and number of selections. User ratings and number of selections are discussed above. In a nonlimiting example, processor 104 may use user ratings and number of selections as key performance indicators (KPIs). Continuing on this nonlimiting example, processor 104 may assign weights for each KPI, such as 70% weight (0.7) for user rating and a 30% weight (0.3) for number of selections. In this nonlimiting example, a weighted score is calculated for each section of the process, such as "homepage," "customer support" and "checkout." Continuing with this nonlimiting example, "homepage" may have received a number of selections of 100 with an average of user ratings of 3.5. In this nonlimiting example, processor 104 may calculate importance score 128 of 61.5 for response module 132 that includes "homepage," which is the result of 0.7*3.5 (user rating)+0.3*100 (number of selection). In embodiments, weights may be present. In other embodiments, processor 104 may use linear optimization to calculate the weights for each KPI. A "linear optimization," as used herein, is a mathematical function for calculating an optimal solution to a problem within a set of constraints, such as calculating the optimal weights for PKIs for calculating importance score 128. For example, without limitations and continuing on the nonlimiting example above, the linear optimization may include an objective function that maximizes (weighted score of "homepage")*(weight of "homepage")+(weighted score of "customer support")*(weight of "customer support")+(weighted score of "checkout")*(weight of "checkout") and a set of constraints that weight of each KPI must be between 0 and 1, and that the sum of all weights must equal to 1. In this nonlimiting example, using linear optimization, processor 104 may reset weights of the KPIs to 80% weight (0.8) for user rating and 20% weight (0.2) for number of selections. In some embodiments, calculating an importance score 128 may further include using one or more response timings. It will be become apparent to one of ordinary skill in the art, upon reading this disclosure, that objective function and linear optimization are described as way of example and that there are many ways, and tools, to calculate importance scores 128 using those formulas.

Continuing to refer to FIG. 1, in some embodiments, determining modification target 124 may include using fuzzy sets and response modules 120. In some embodiments, combinations of section, subsection and criteria may be used as variables in a fuzzy set calculation. For example, without limitations, a variable may be "website/navigation/ease-of-use." In further embodiments, fuzzy sets may be defined for each variable. In an embodiment, a fuzzy set may be a range for a user rating. For example, without limitations, a fuzzy set may be a user rating ranging from 1 to 10, which corresponds to a rating range presented to user. In embodiments, each response module 132 of the plurality of response modules 120 may be converted to fuzzy values based on the fuzzy sets. For example, without limitations, a response module 132 may include a rating of 6 for the "website/navigation/ease-of-use," which may be assigned a membership value of 0.6 in the user rating fuzzy set. In further embodiments, fuzzy sets may be defined as categories of user ratings. In a nonlimiting example, fuzzy sets may be defined as "dissatisfied" that may include user ratings from 1-3, "neutral" that may include ratings from 4-7, and "satisfied" that may include user ratings from 8-10. Continuing these nonlimiting examples, a response module 132 may include a rating of 6 for the "website/navigation/ease-of-use," which may be assigned a membership value of 0.6 which may be included in the "neutral" fuzzy set. In an embodiment, processor 104 may determine one or more modification targets 124 based on the fuzzy sets. In embodiments, determining modification target 124 may include determining for all section/subsection/criteria with a membership value below a threshold. In embodiments, determining modification target 124 may be based on category of fuzzy sets. In a nonlimiting example, processor 104 may determine a section/subsection/criteria with most membership within a "dissatisfied" fuzzy set as a modification target 124. Fuzzy sets are described in more detail in reference to FIG. 6.

With continued reference to FIG. 1, in embodiments, determining the modification target 124 may include ranking each response module 132 of the plurality of response modules 120 as a function of importance score 128. In some embodiments, processor 104 may be configured to rank the plurality of response modules 120 based on a scoring criterion. A "scoring criteria," as used herein, refers to the criteria used for scoring each response module 132. In an embodiment, scoring criteria may be based on user ratings. In a nonlimiting example, processor 104 may select a response module 132, section/subsection/criteria, with the lowest user rating as a modification target 124. In some embodiments, scoring criteria may include a number of selections. In an embodiment, scoring criteria may include a response timing. In a nonlimiting example, processor 104 may select all response modules 132 with the lowest user rating, such as a rating of 1, and subsequently determine the section/subsection/criteria with the greatest number of selections as modification target 124. In another nonlimiting example, processor 104 may select response module 132 with the greatest number of selections, and if two or more response modules 132 have the same number of selection, processor 104 subsequently may determine section/subsection/criteria with the lowest rating, among the selected response modules 132, as a modification target 124. Ranking may include any ranking method described in this disclosure. It will be apparent to one of ordinary skill in the art, upon reading this disclosure, of the many criteria that can be used to score each response module 132 and the many ways that those response modules 132 can be ranked.

Still referring to FIG. 1, in embodiments, processor 104 is configured to identify at least a process modification 136 as a function of the process data 112 and at least a modification target 124. A "process modification," as used herein, is a data structure that includes entries identifying parts of a process to be modified. In an embodiment, process modification 136 may be stored in a database or any other type of data storage structure. In some embodiments, process modification 136 may be stored as "section/subsection/criteria" coupled with a field identifying a modification. In a further nonlimiting example, process modification 136 may include "checkout/payment/methods of payments" data structure coupled with a field containing instructions for improving the "methods of payment" in the "payment" subsection in the "checkout" section, which may be represented as "add payment methods to the billing module of website A." In a continuing nonlimiting example, process modification 136 may include a computer instruction such as "billing=add.payment_method (Amex)." In this nonlimiting example, a method for using American Express payments will be added, through the "add" method, to the "billing" class. In a nonlimiting example, process modification 136 may include steps for improving checkout process step, such as increasing available servers for the website, based on modification target 124 determined from response modules 132 indicating negative feedback from users related to that process step.

With continued reference to FIG. 1, in an embodiment, identifying the at least a process modification 136 may include receiving module training data 140. In embodiments, module training data 140 may include correlations of process modules to process modifications. In some embodiments, process modules and/or process modifications may be included in a database. Process modules may include previously generated response modules 120. In some embodiments, process modules may include mock data, such as simulated response modules 120. In embodiments, process modifications may include previously generated process modifications 136. In embodiments, process modifications may include predetermined process modifications 136, such as preset modification plans for a process. Training data may be preprocessed. A "preprocessed training data," as used herein, is data that have been transformed from raw form to a format that can be used for training a machine learning model. Preprocessing may include data cleaning, feature selection, feature scaling, data augmentation and the like. Data cleaning may include steps such as removing replicated data, handling missing data, correcting data errors, standardizing data, identifying outliers, and the like. In a nonlimiting example, data cleaning may include utilizing algorithms for identifying duplicate entries or spell-check algorithms. In a nonlimiting example, processor 104 may use feature selection to filter out correlations of data that does not comport to an entity's set section, subsection and/or criteria priorities. In a further nonlimiting example, if the data includes correlations of modification targets 124 to process modifications 136 where the modifications targets 124 were generated based on importance scores 128 that were calculated based on priorities that do not match that of the entity using apparatus 100, those correlations will be filtered out form the data to be used as module training data. For example, without limitations, if the data being used was generated for an entity that set a "checkout" section as having middle priority, this data will be filtered out if the entity using the training data has a section priority for "checkout" set as high priority. In some embodiments, preprocessing may include utilizing machine-learning algorithms. In a nonlimiting example, machine learning may be used for identifying relevant data to be used as training data, such as for a feature selection preprocessing step. Module training data 140 may be consistent with training data described in reference to FIGS. 3-6.

Continuing to refer to FIG. 1, in some embodiments, identifying the at least a process modification 136 may include training a response module machine learning model 144 using the module training data 140. In some embodiments, response module machine learning model 136 may receive modification target 124 and process data 112 as inputs and output at least a process modification 136. Response module machine learning model 144 may include any machine learning model described throughout this disclosure. Response module machine learning model 144 may include a classifier. Classifier may include any classifier described herein. In a nonlimiting example, response module machine learning model 144 may receive a modification inputs of "checkout/payments/methods of payments" and the computer logic classes and methods for website A and output a process modification 136 of "add method payment to billing class" based on training data that includes correlations of method of payment criteria and computer logic samples that include billing and add payment methods. response module machine learning model 144 may be consistent with any machine learning algorithms described in reference to FIGS. 3-6.

Still referring to FIG. 1, in embodiments, identifying the at least a process modification 136 may include determining the at least a process modification 136 as a function of the response module machine learning model 144. Response module machine learning model and module training data may include any machine learning model and training data described in reference to FIGS. 3-6.

Continuing to refer to FIG. 1, in an embodiment, processor 104 is configured to generate process enhancement 148 as a function of the at least a process modification 136. A "process enhancement," as used herein, is a data structure representing a set of steps to improve a process as a whole. In some embodiments, process enhancement 148 may include one or more process modifications 136. In a nonlimiting example, process enhancement 148 may include a set of improvements to the process, such as on how to reorganize inventory display on a website and to improve overall speed of checkout process step. In some embodiments, process data 112 may include previously generated process enhancements 148. In embodiments, processor 104 may be configured to add process enhancement 148 to process data 112. In a nonlimiting example, process data 112 may include steps of a process, such as a checkout function of a website, and previously generated improvement steps related to the checkout function. In some embodiments, processor 104 may be further configured to generate enhancement training data. In an embodiment, enhancement training data may be included in a database. In embodiments, enhancement training data may include correlation of two or more processes to process modifications 136. In a nonlimiting example, enhancement training data may include a correlation of the process modification 136 of a first process to the effect that this change will cause to another process, such as how a process modification 136 of the overall presentation of a website may also modify the time a user takes for the checkout process step. In embodiments, processor 104 may be further configured to generate an additional process modification using an enhancement machine learning model. In some embodiments, enhancement machine learning model may be trained using enhancement training data. In an embodiment, enhancement machine learning model may receive at least a process modification 136 as input and output an additional process modification. An "additional process modification," as used herein, is an incidental process improvement change that occurs due to a process modification 136. In some embodiments, processor 104 may be configured to add the additional process modification to module training data 140. In some embodiments, process enhancement 148 may include a list of process modifications 136. In a nonlimiting example, process enhancement 148 may provide a list which may be used by software engineers for creating design improvements. In other embodiments, process enhancement 148 may include a set of computer instructions for applying the modification based on at least a process modification 136. In a nonlimiting example, process enhancement 148 may be applied to process within a sandbox application, where quality engineers and software engineers may supervise the code changes and make appropriate further modifications. In some embodiments, process enhancement 148 may be outputted to a code generation AI for generating modifications based on at least a process modification 136. AI code generator may include products such as GitHub Copilot, generated by GitHub Inc, located at 88 Colin P Kelly Junior St, San Francisco, California, 94107, United States. Enhancement training data and enhancement machine learning model may include any methods or processes described in reference to FIGS. 3-6.

Continuing to refer to FIG. 1, in some embodiments, generating process enhancement 148 may include identifying an effect of a process modification 136. In an embodiment, processor 104 may be configured to identify an effect of one process modification 136 on other process modifications 136. In an embodiment, processor 104 may be configured to identify an effect of at least a process modification 136 to the process as a whole. Identifying an effect of at least a process modification may include techniques such as A/B testing, Multivariate testing, User testing, Split URL testing, Heatmap analysis, Funnel analysis, and the like. In a nonlimiting example, processor 104 may identify an enhancement goal. In a nonlimiting example, enhancement goal may be based on a goal preset by an entity. In another example, without limitations, enhancement goals may be process modifications 136. Continuing on this nonlimiting example, processor 104 may create multiple duplicate versions of process within a sandbox environment. A "sandbox environment," as used herein, is a virtual environment where changes performed do not affect live version of process, the process data 112. Still on the nonlimiting example, processor 104 may generate a sperate version of process for each process modification 136, other versions including two or more processes from a plurality of process modifications 136 and a version that includes all process modifications 136. Continuing on the nonlimiting example, process 104 may use debug software to catch any error for all the versions, if errors arise version may be modified by a software engineer or deleted. Still on the same nonlimiting example, the versions that have not been deleted are then presented to users for feedback. In some embodiments, feedback for each version may be used as user input 116 and a new process enhancement 148 may be generated for each version. Final modification to process data 112 may be performed by entity or users that manage the process.

Still referring to FIG. 1, in an embodiment, processor 104 may be configured to modify a computing device as a function of process enhancement 148.

With continued reference to FIG. 1, in an embodiment, processor 104 may be configured to receive process data from a user device 152. In some embodiments, processor 104 may be configured to receive user input 116 from user device 152. In an embodiment, processor 104 may be configured to transmit process enhancement to user device 152. In embodiments, user device 152 may be configured to transmit process data 112. User device 152 may transmit a plurality of data described herein using communication protocols such as HTTP/HTTPS (HyperText Transfer Protocol), FTP (File Transfer Protocol), WebSocket, MQTT (Message querying Telemetry Transport), CoAP (Constrained Application Protocol), and the like. A "user device," as used herein, is a computing device capable of displaying information. User device 152 may include any computing device described throughout this disclosure. In some embodiments, process enhancement 148 may contain instructions configuring user device to display a process enhancement output. In some embodiments, processor 104 may configure user device 152 to interact with a user based on previously generated importance scores 128. In some embodiments, processor 104 may configure user device 152 to interact with a user based on previously generated process modifications 136. In some embodiments, processor 104 may configure user device 152 to interact with a user based on previously generated process enhancements 148. User device 152 may be configured to interact with a user using a chatbot. User device 152 User device 152 may include a user interface. User interface may include a graphical user interface (GUI). User interface may include response module interface. Module response interface is described in reference to FIGS. 2A-C.

Figure 2A:
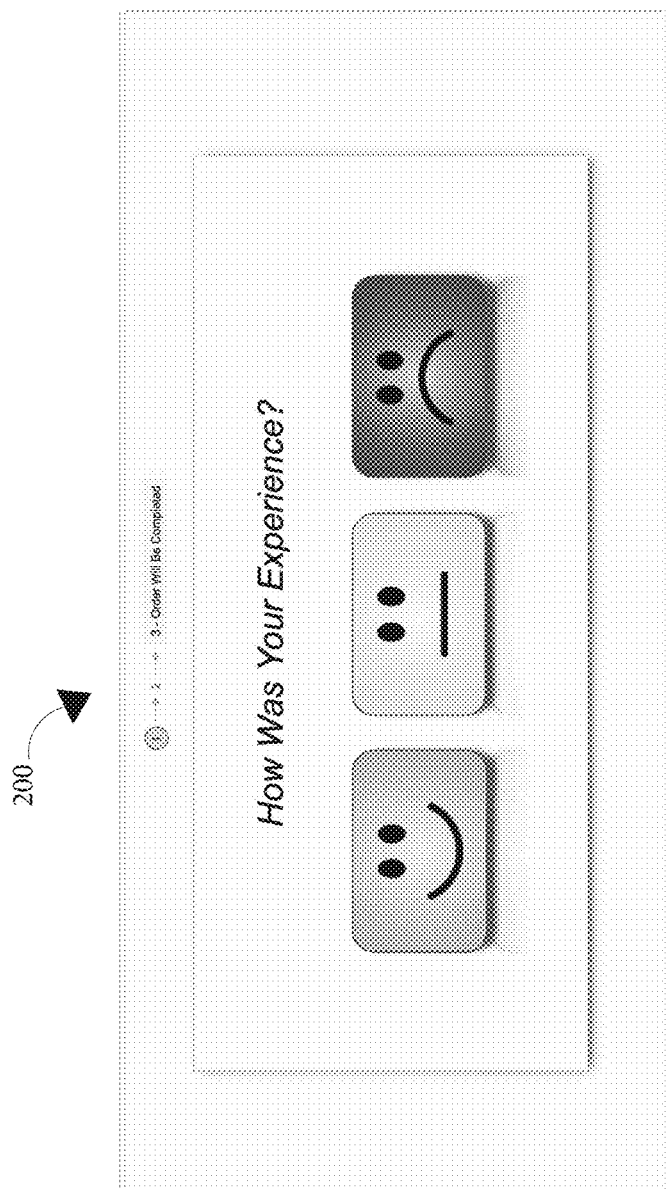
FIG. 2A is an exemplary embodiment of a response module interface with a first set of options.
Figure 2B:
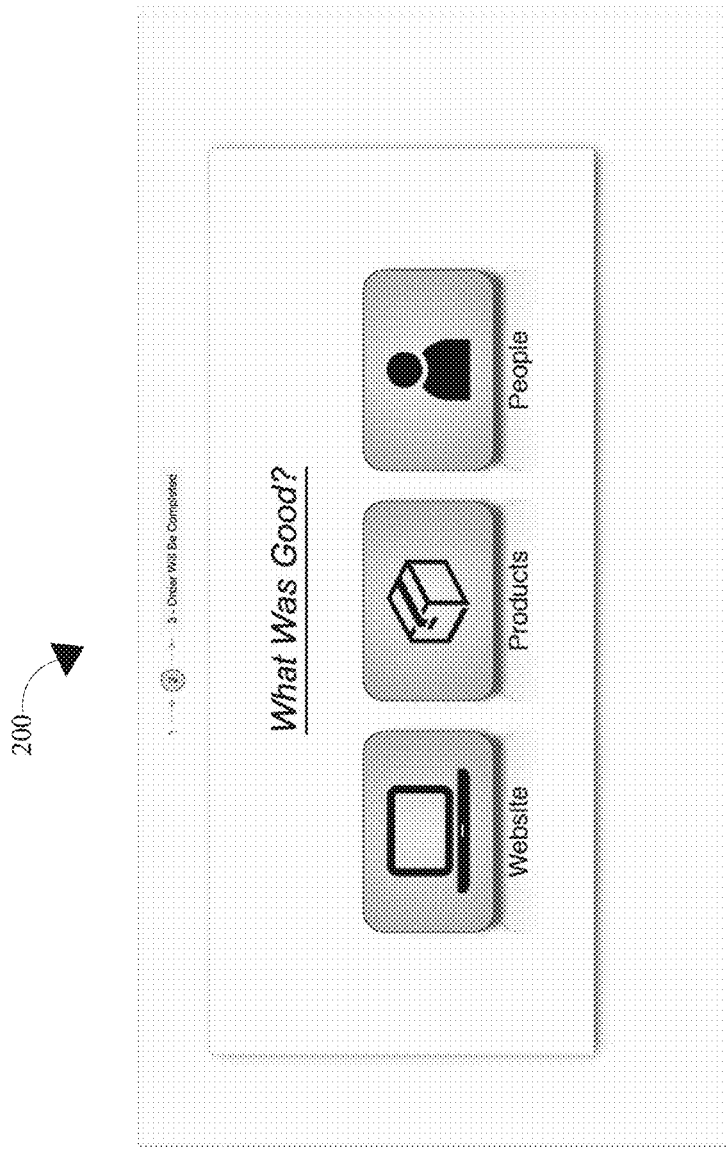
FIG. 2B is an exemplary embodiment of a response module interface with a second set of options.
Figure 2C:
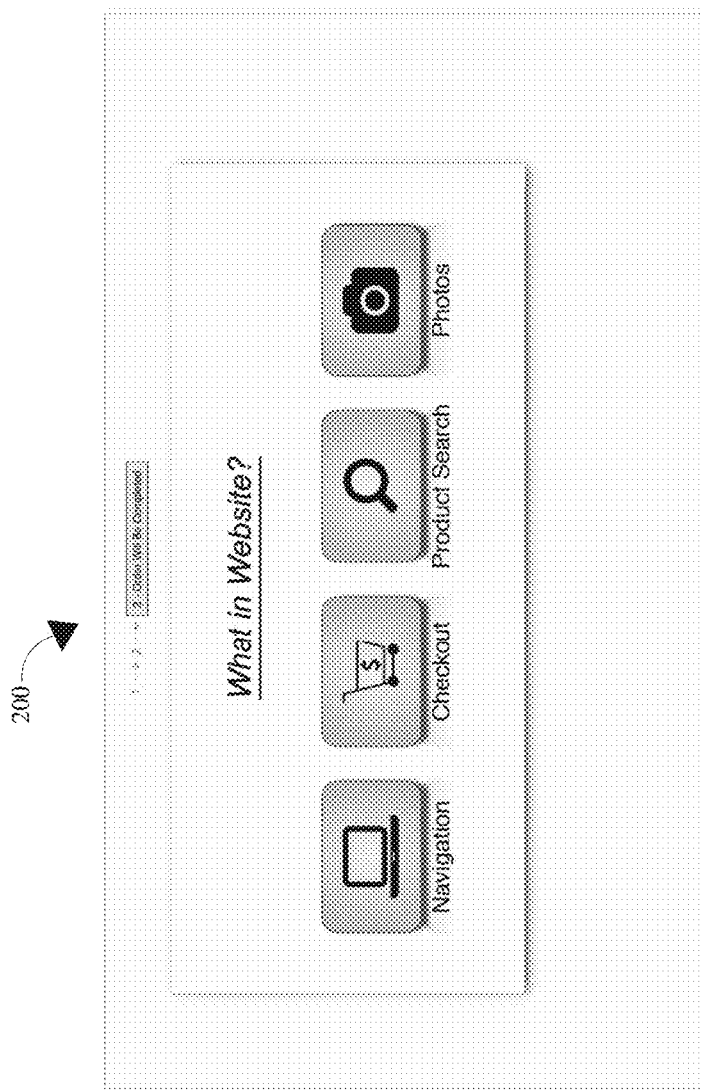
FIG. 2C is an exemplary embodiment of a response module interface with a third set of options.

Now referring to FIGS. 2A-C, exemplary embodiments of a response module interface 200 are presented. In embodiments, a response module interface 200 is configured to be displayed in a computing device. In embodiments, computing device may include any device capable of displaying a Graphical User Interface (GUI). Computing device may be communicatively connected to processor 104. Computing device may include user device 152. In an embodiment, module interface 200 may be a Graphical User Interface (GUI). In embodiments, computing device may be configured to display any data structure described throughout this disclosure. In nonlimiting examples, computing device may be a smartphone, smartwatch, laptop, desktop computer, virtual reality headset and the like. In embodiments, computing device may include a display. Display may include any display capable of presenting information in graphical form. In embodiments, Display may be configured to display a GUI. In embodiments, computing device may include a plurality of displays. In embodiments, display is configured to display a window. A "window," as used herein, is a graphical representation that occupies at least a position of the display. In embodiments, window may occupy the entire display. In some embodiments, display may be communicatively connected to computing device. In some embodiments, a window may include one or more tabs. A "tab," as used herein, is a subsection of a window. In a nonlimiting example, computing device may transmit information to display. In an example, without limitations, a user may navigate through a first second, third and fourth window (and so on) by interacting with display. In another nonlimiting example, a user may navigate through a first second, third and fourth window (and so on) by interacting directly with computing device, and indirectly with display, such as when information is being transmitted to a remote display. may further contain event handlers, wherein the placement of text within a textbox may signify to computing device, or display, to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In a nonlimiting example, a user response module 200 may present users with options based on prior process enhancements 148. In some embodiments, user response module may present options for section, subsection and criteria based on priorities. In some embodiments, user response module 200 may present user with options based on prior importance scores 128 calculated for a section/subsection/criteria. In some embodiments, user response module 200 may present user with options based on modification targets 124 determined for other users. It will be apparent to one ordinary skill, upon reading this disclosure, that user response module 200 may present users with options based on any aspect of prior iterations of apparatus 100.

Now referring to FIG. 2A an exemplary embodiment of a response module interface 200 is presented. In this nonlimiting example, response module interface 200 may present a user with a first set of options. In a nonlimiting example, user may be presented with a criteria set of options. In this nonlimiting example, a user may be presented with three options for ranking their experience.

Now referring to FIG. 2B, another exemplary embodiment of a response module interface 200 is illustrated. In this nonlimiting example, response module interface 200 may present user with a second set of options that are compounded with the first set of options discussed in reference to FIG. 2A. In this nonlimiting example, a user may be presented with a set of sections where the ranking should apply to.

Now referring to FIG. 2C, another exemplary embodiment of a response module interface 200 is illustrated. In this nonlimiting example, response module interface 200 may present user with a third set of options that are compounded with the first and second set of responses discussed in reference to FIGS. 2A and 2B. In this nonlimiting example, a user may be presented with a set of sub-sections of the section chosen at FIG. 2B. In an embodiment, upon a selection of a subsection by the user, a response module 132 may be generated based on the responses. In a nonlimiting example, if a user choses "neutral" face icon at first set of options, then chooses "website" at second set of options and "product search" at the third set of options, apparatus 100 may generate a response module of "criteria: 'user experience' rating 2/3, subsection: 'product search', section: 'website'."

Figure 3:
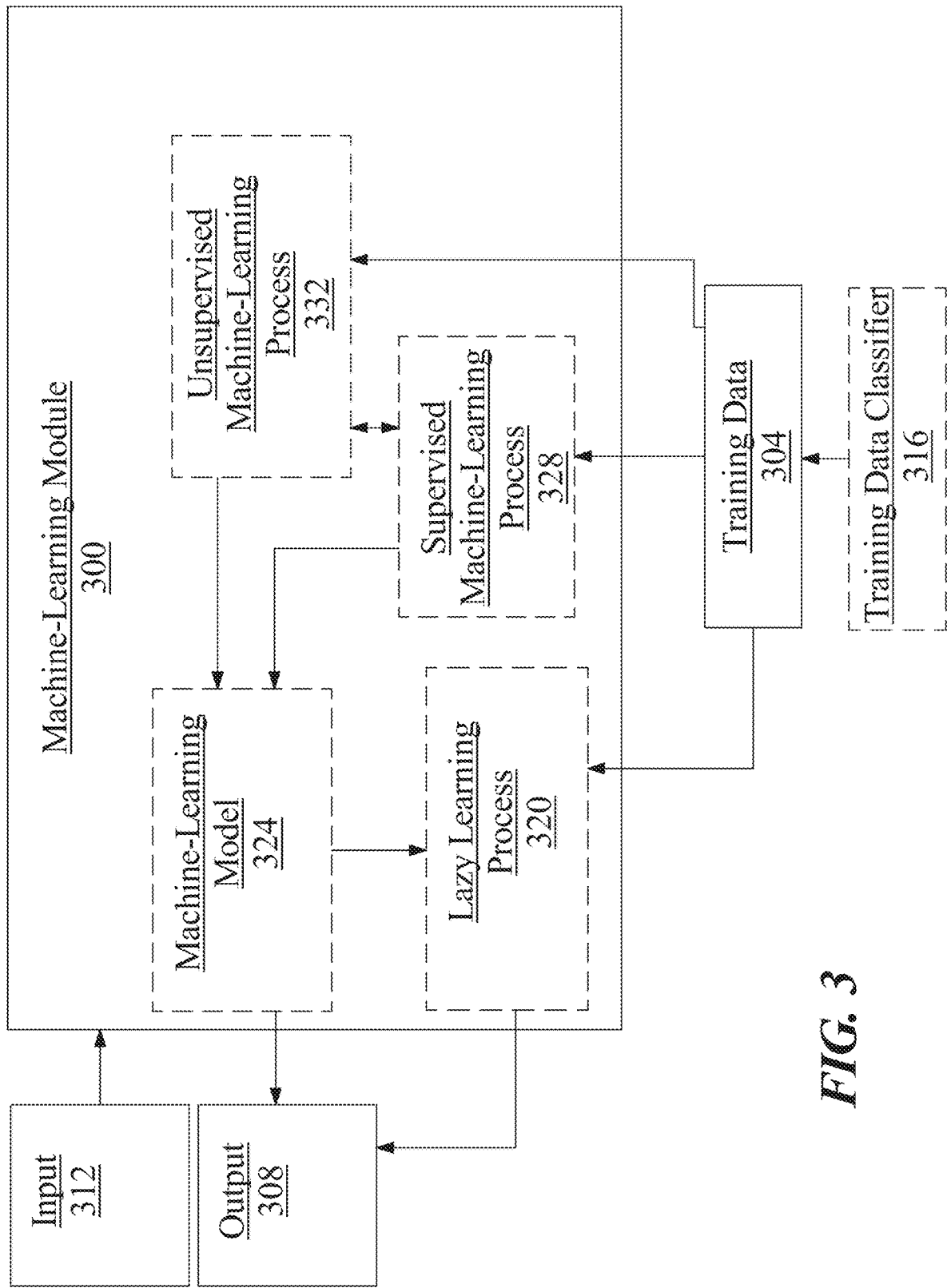
FIG. 3 is a block diagram of an exemplary embodiment of a machine learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, need for transportation may be an input and a closely associated goal, such as financing a vehicle, may be an output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
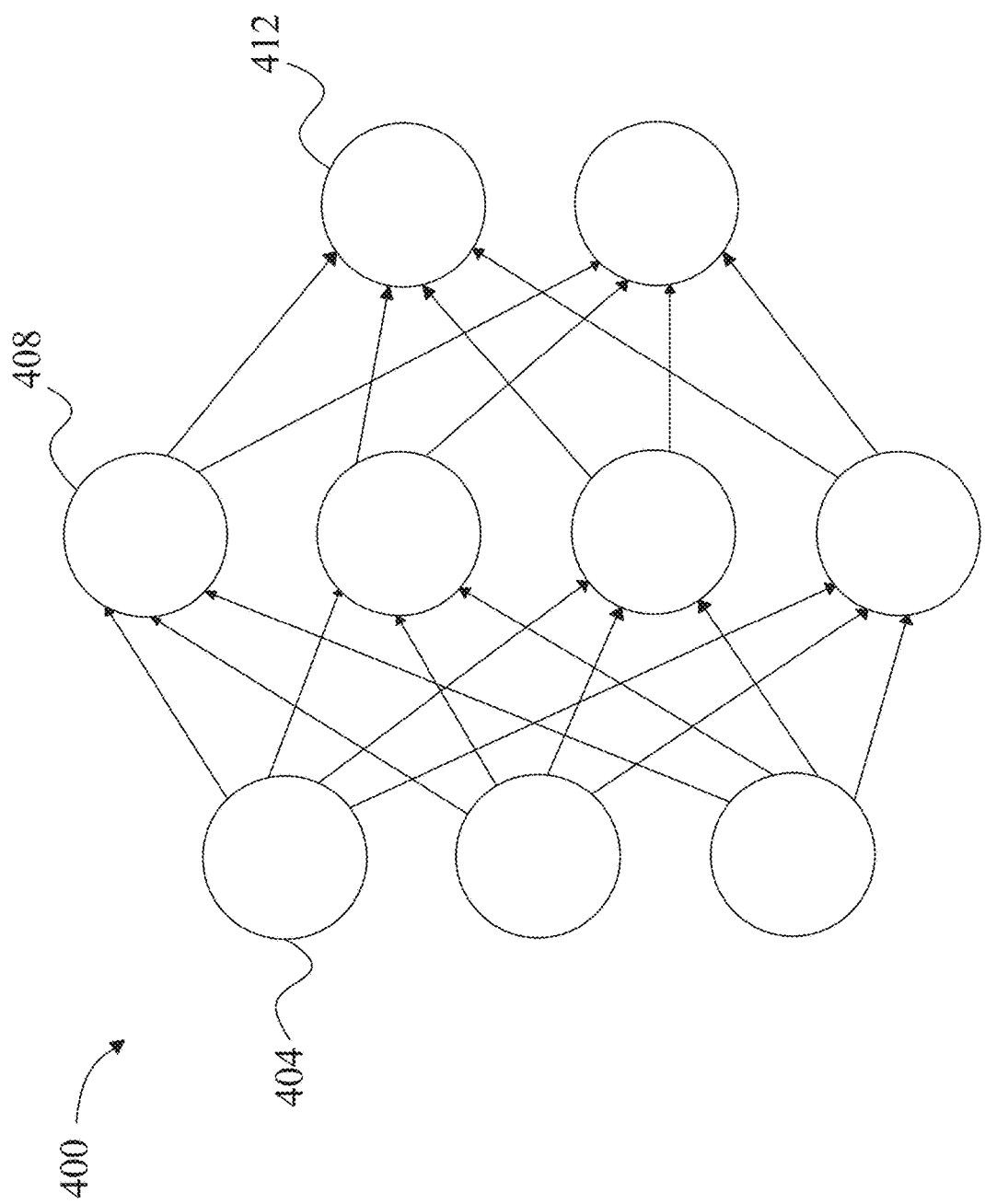
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
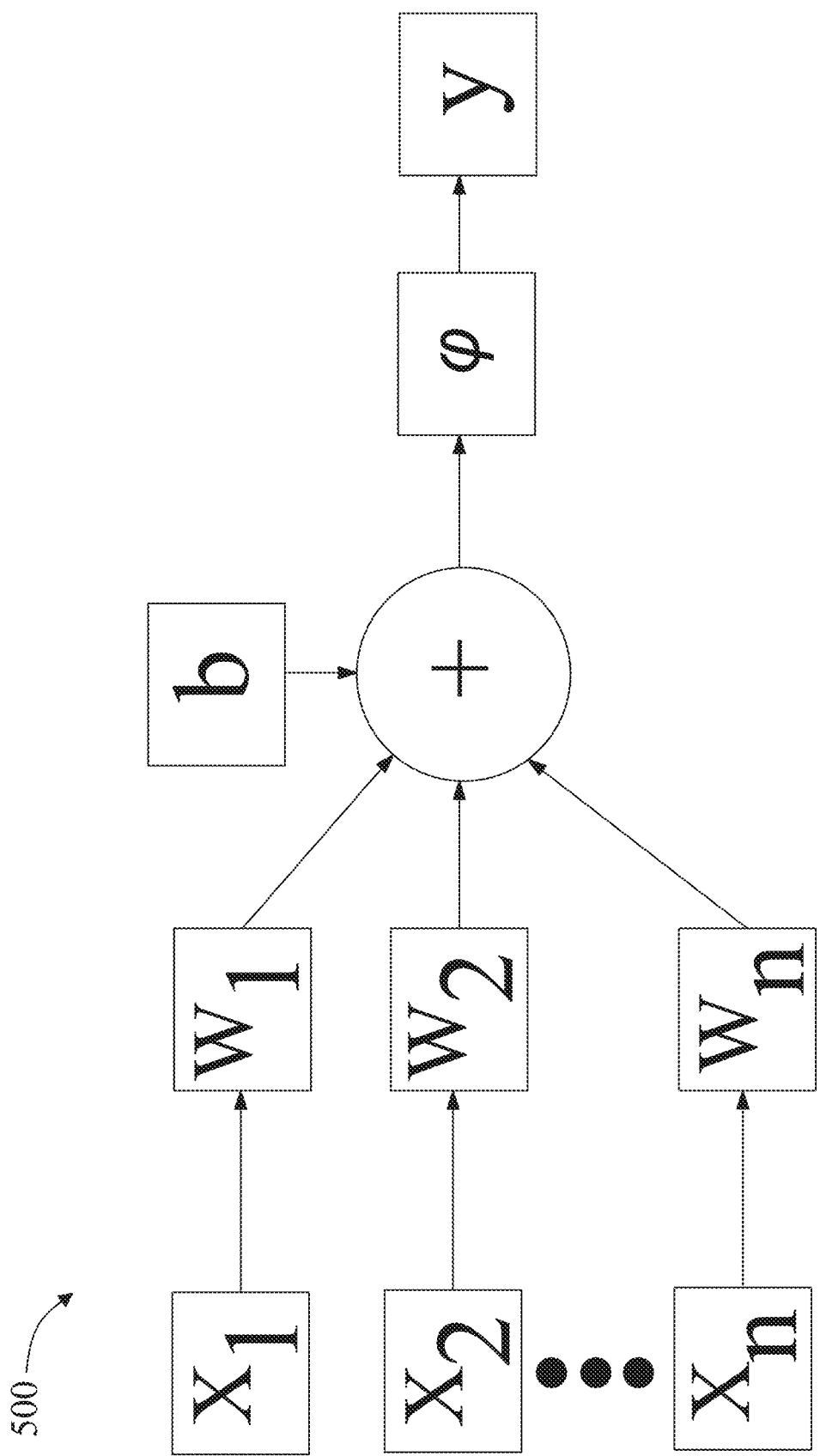
FIG. 5 is a diagram of an illustrative embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
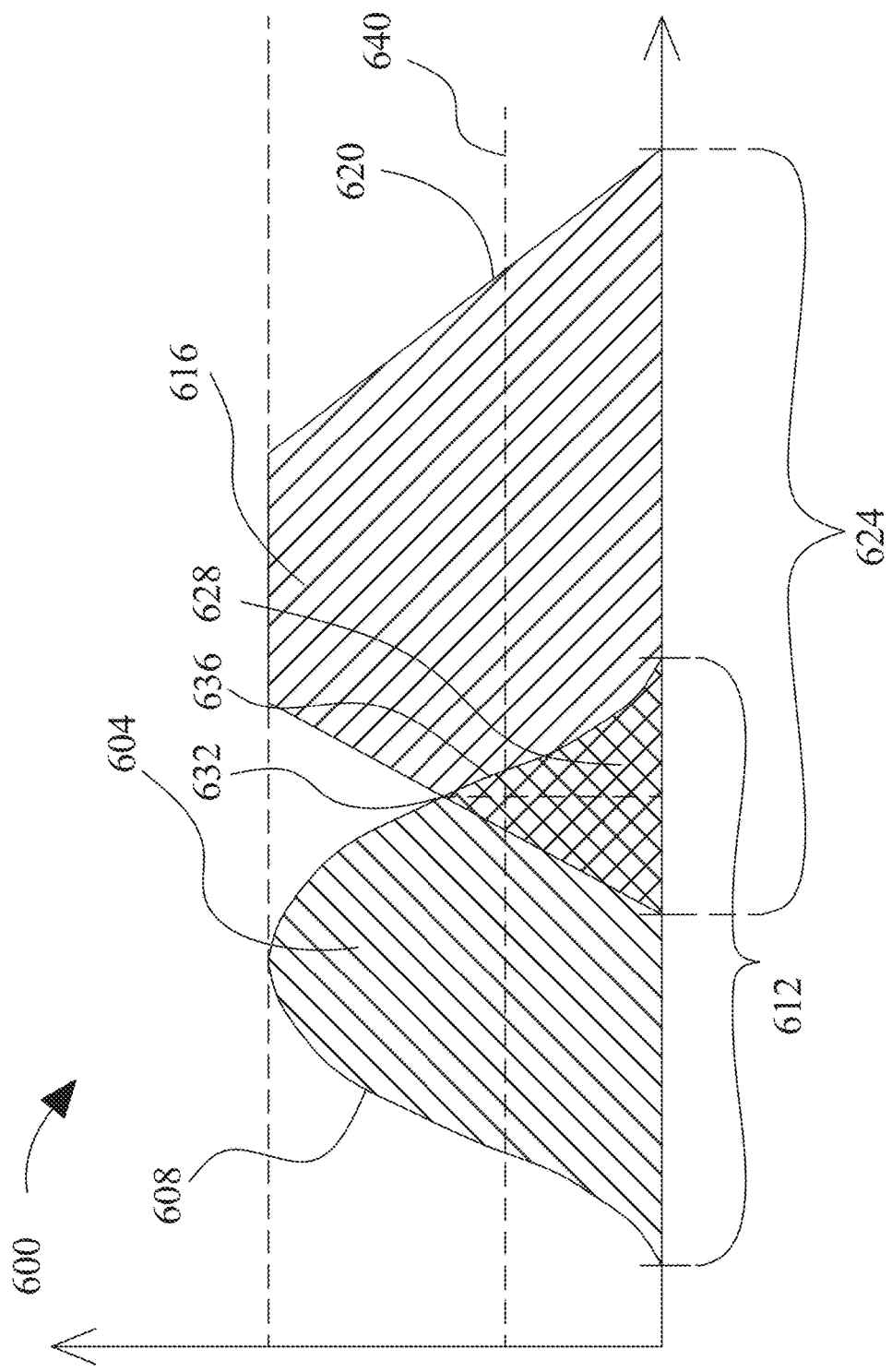
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a modification target 124 and process data 112 to process modification 136. For instance, if a task has a fuzzy set matching a task associated with a role fuzzy set by having a degree of overlap exceeding a threshold, processor 104 may classify the condition as belonging to a goal. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a task may be compared to multiple user state fuzzy sets. For instance, task may be represented by a fuzzy set that is compared to each of the multiple current role fuzzy sets; and a degree of overlap exceeding a threshold between the condition fuzzy set and any of the multiple current role fuzzy sets may cause apparatus 100 to classify the condition as belonging to a goal. For instance, in one embodiment there may be two goals fuzzy sets, representing respectively a pecuniary and a health goal. Pecuniary goal may have a pecuniary fuzzy set; health goal may have a health fuzzy set; and condition may have a condition fuzzy set. Processor 104, for example, may compare a condition fuzzy set with each of pecuniary fuzzy set and health fuzzy set, as described above, and classify a condition to either, both, or neither of pecuniary or health. Machine-learning methods as described throughout may, in a non-limiting example, generate coefficients used in fuzzy set equations as described above, such as without limitation x, c, and σ of a Gaussian set as described above, as outputs of machine-learning methods. Likewise, task may be used indirectly to determine a fuzzy set, as task fuzzy set may be derived from outputs of one or more machine-learning models that take the task directly or indirectly as inputs.

Figure 7:
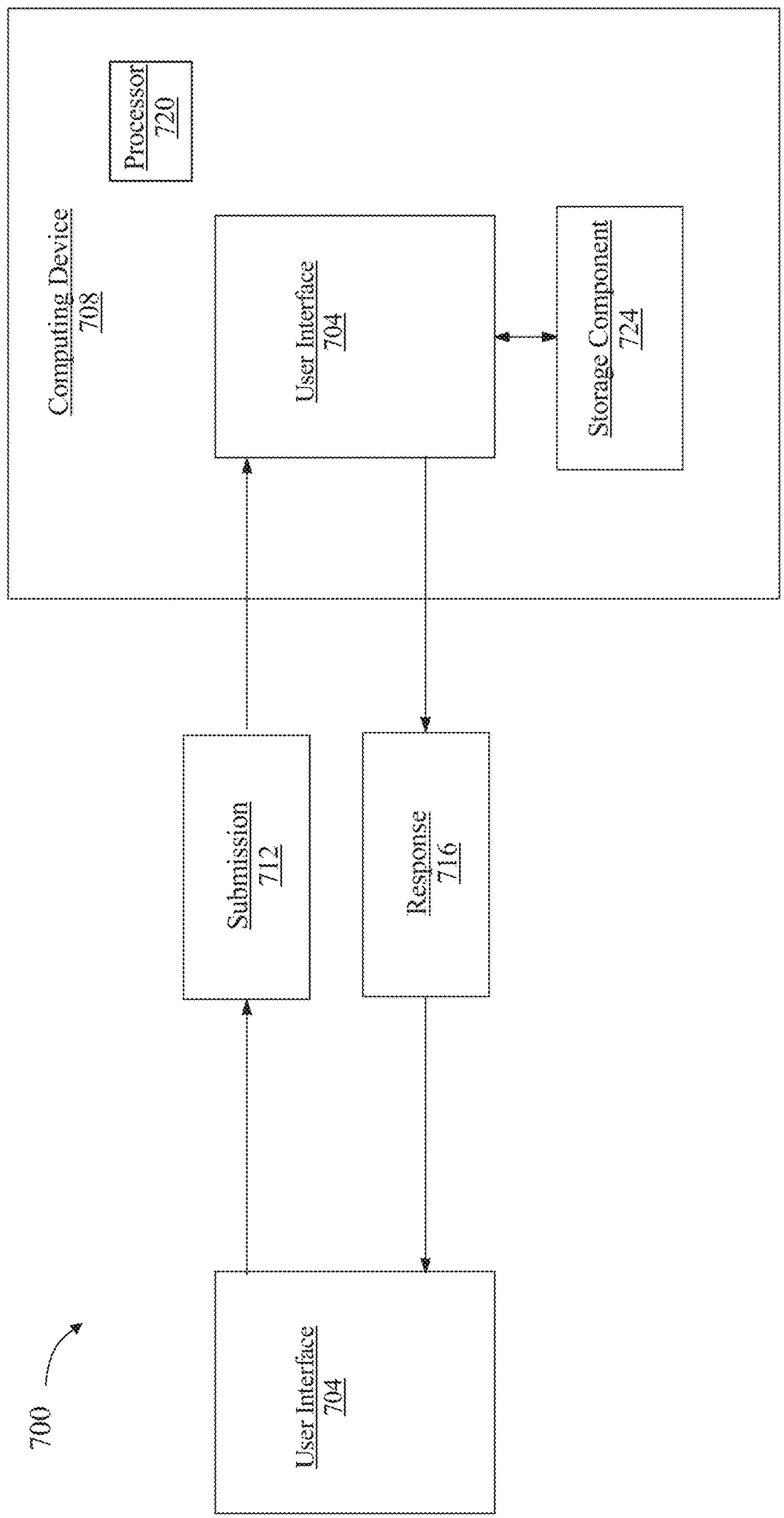
FIG. 7 is an illustrative embodiment of a chatbot system.

Now referring to FIG. 7, an illustrative embodiment of a chatbot system 700 is presented. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. In some embodiments, computing device 708 may include user device 152. In embodiments, computing device 708 may be communicatively connected to processor 104. Alternatively or additionally, user interface 704 may communicate with computing device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 704 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor 720. In some embodiments, processor 720 processes a submission 712 using one or more of keyword recognition, pattern matching, and natural language processing. In some embodiments, processor employs real-time learning with evolutionary algorithms. In some cases, processor 720 may retrieve a pre-prepared response from at least a storage component 724, based upon submission 712. Alternatively or additionally, in some embodiments, processor 720 communicates a response 716 without first receiving a submission 712, thereby initiating conversation. In some cases, processor 720 communicates an inquiry to user interface 704; and the processor is configured to process an answer to the inquiry in a following submission 712 from the user interface 704. In a nonlimiting example, an answer to an inquiry presented within a submission 712 from user device 152 may be used by processor 104 as an input to another function, for example without limitation a compound question.

Figure 8:
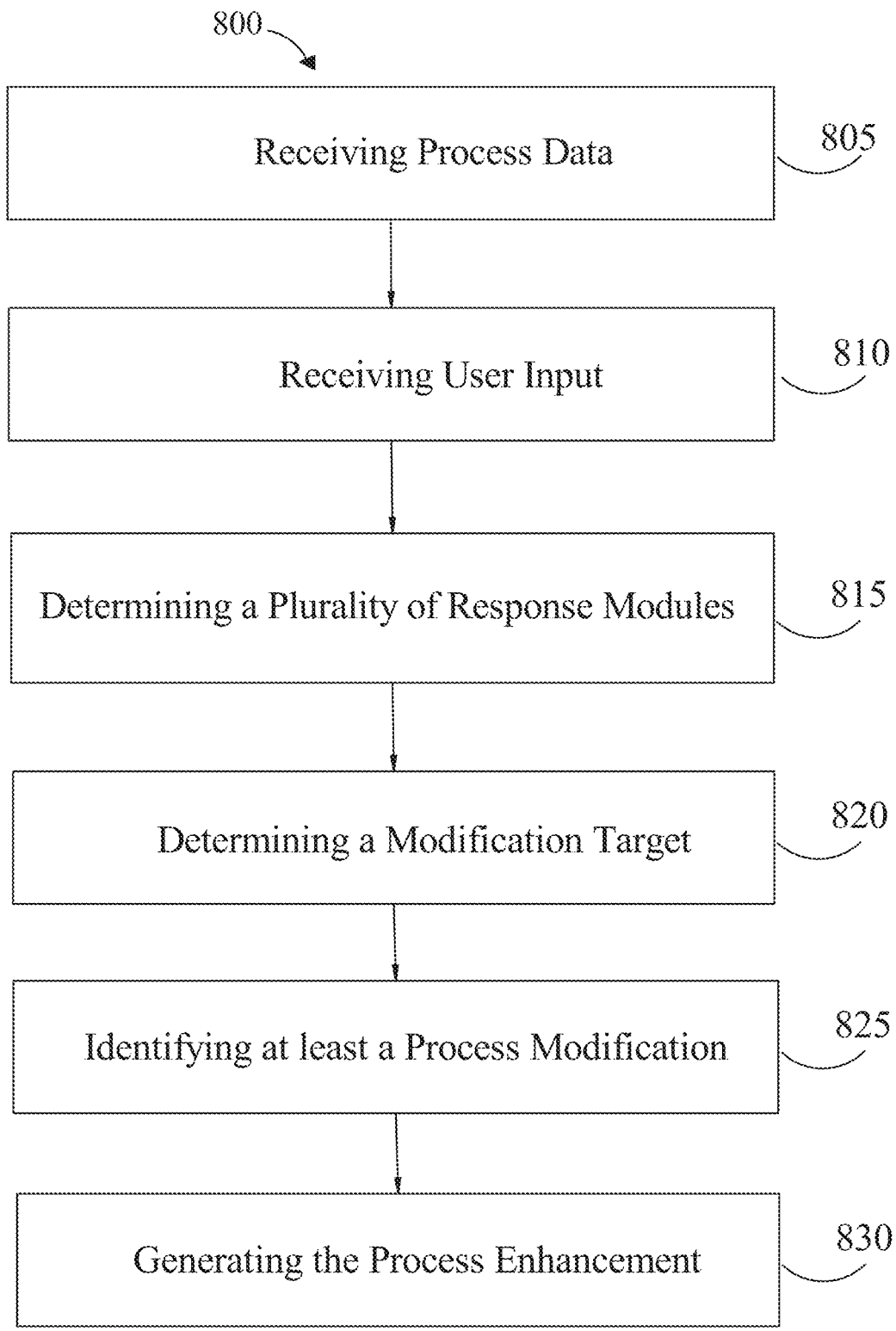
FIG. 8 is a flow diagram illustrating an embodiment of a method for generating a process enhancement.

Now referring to FIG. 8, a method 800 for generating a process enhancement is presented. Method 800, at step 805, includes receiving process data 112. In some embodiments, method 800 may include receiving process data 112 from user device 152.

Continuing to refer to FIG. 8, in embodiments, method 800, at step 810, includes receiving user input 116. In some embodiments, method 800 may include receiving user input 116 from user device 152. In an embodiment, method 800 may include receiving user input 116 using a chatbot.

With continued reference to FIG. 8, in embodiments, method 800, at step 815, includes determining a plurality of response modules 120 as a function of user input 116.

Continuing to refer to FIG. 8, at step 820, in some embodiments, method 800 includes determining modification target 124 as function of plurality of response modules 120. In some embodiments, method 800 may include calculating importance score 128 for each response module 132 of the plurality of response modules 120. In some embodiments, calculating importance score 128 may include minimizing an objective function. In embodiments, method 800 may include ranking each response module 132 of plurality of response modules 120 as a function of importance score 128. In embodiments, method 800 may include determining modification target 124 as a function of the ranking.

Still referring to FIG. 8, in some embodiments, method 800, at step 825, includes identifying at least a process modification 136 as a function of process data 112 and modification target 124. In embodiments, method 800 may include generating module training data 140, wherein module training data 140 includes correlations of process modules to process modifications. In embodiments, method 800 may include training response module machine learning model 144 using module training data 140, wherein response module machine learning model 144 may receive modification target 124 and process data 112 as input and output at least a process modification 136. In further embodiments, method 800 may include determining at least a process modification 136 as a function of the response module machine learning model.

With continued reference to FIG. 8, in some embodiments, method 800, at step 830, includes generating process enhancement 148 as a function of at least a process modification 136. In an embodiment, method 800 may further include transmitting process enhancement 148 to user device 152. In an embodiment, method 800 may further include generating enhancement training data. Ion embodiments, method 800 may include training an enhancement machine learning model using the enhancement training data. In embodiments, method 800 may include generating an additional process modification using the enhancement machine learning model. In some embodiments, method 800 may include generating the process enhancement as a function of at least a process modification 136 and the additional process. In some embodiments, method 800 may include adding the additional process modification to module training data 140. In some embodiments, method 800 may further include adding process enhancement 148 to process data 112.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
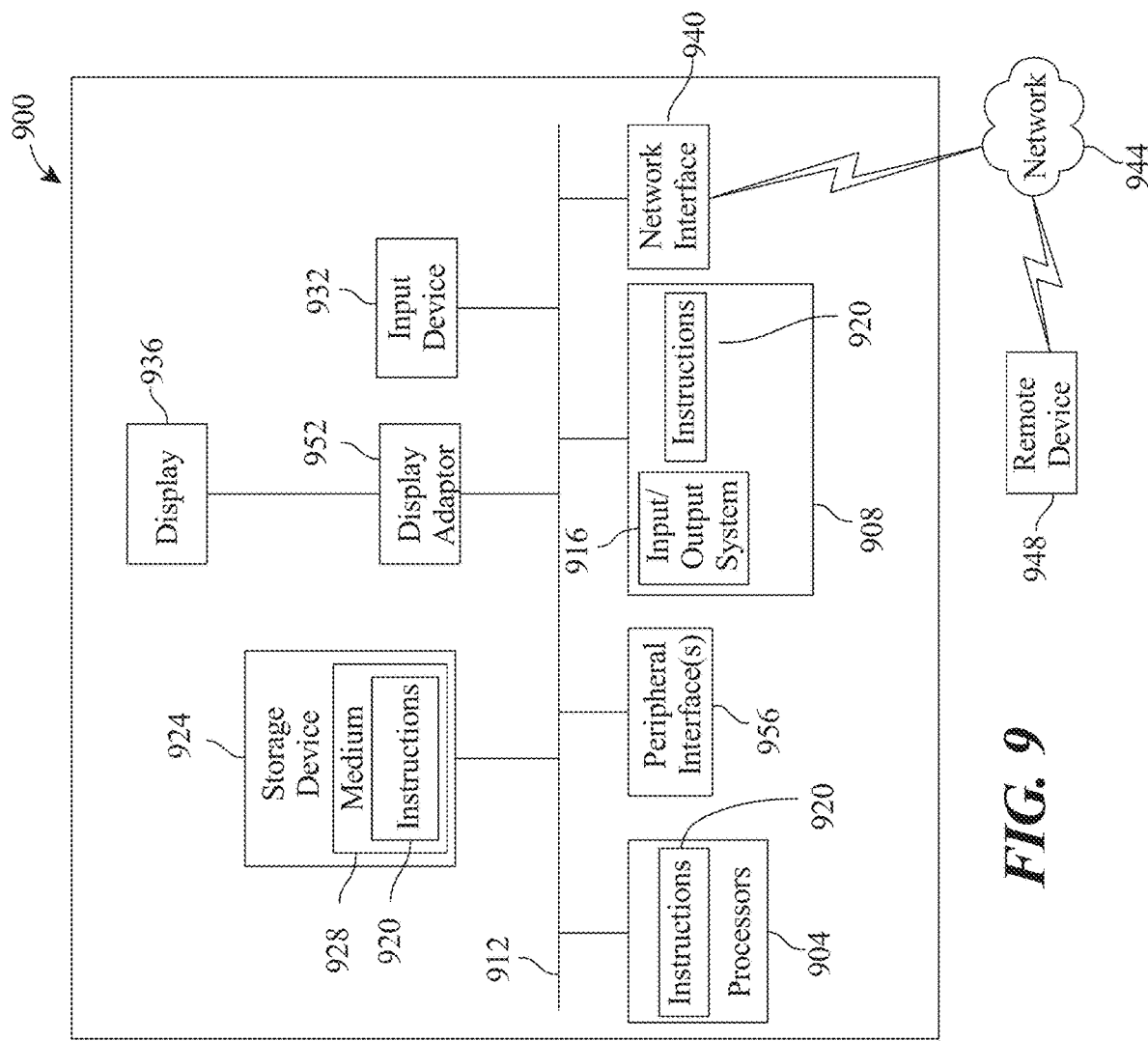
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a process enhancement, the apparatus comprising: at least a processor; and
    a memory communicatively connected to the at least a processor, wherein the memory contains instructions configuring the at least a processor to:
    receive
    process data;
    receive user
    input;
    determine a plurality of response modules as a function of the user input;
    determine a modification target as function of the plurality of response modules; identify at least a process modification as a function of the process data and the
    modification target; and
    generate a process enhancement as a function of the at least a process modification, wherein generating the process enhancement further comprises:
    generating enhancement training data;
    training an enhancement machine learning model using the enhancement training data wherein training the enhancement machine learning model comprises preprocessing the enhancement training wherein preprocessing the enhancement training data comprises at least data cleaning;
    generating an additional process modification using the enhancement machine learning model; and
    generating the process enhancement as a function of the at least a process modification and the additional process modification.

2. The apparatus of claim 1, wherein receiving user input comprises receiving the user input using a chatbot.

3. The apparatus of claim 1, further configured to generate module training data.

4. The apparatus of claim 3, wherein the processor is further configured to add the additional process modification to the module training data.

5. The apparatus of claim 3, wherein identifying the at least a process
  modification comprises: generating module training data, wherein the module training data comprises
    correlations of process modules to process modifications;
  training a response module machine learning model using the module training data, wherein the response module machine learning model receives the modification target and process data as input and output at least a process modification; and
  determining the at least a process modification as a function of the response module machine learning model.

6. The apparatus of claim 1, wherein the enhancement machine learning model is a neural network.

7. The apparatus of claim 1, wherein the processor is further configured to add the process enhancement to the process data.

8. The apparatus of claim 1, wherein the processor is configured to calculate an importance score as a function of a priority.

9. The apparatus of claim 1, wherein determining the modification target comprises using a fuzzy set comparison.

10. The apparatus of claim 1, wherein determining the modification target further comprises: calculating an importance score for each response module of the plurality of response
  modules; and
  determining the modification target as a function of the calculated importance scores.

11. A method for generating a resolution
  enhancement plan, the method comprising: receiving, by at least a processor, process data;
  receiving, by the at least a processor, user input;
  determining, by the at least a processor, a plurality of response modules as a function of the user input;
  determining, by the at least a processor, a plurality of response modules as a function of the user input;
  determining, by the at least a processor, a modification target as function of the plurality of response modules;
  identifying, by the at least a processor, at least a process modification as a function of the process data and the modification target; and
  generating, by the at least a processor, a process enhancement as a function of the at least a process modification, wherein generating the process enhancement further comprises:
    generating enhancement training data;
    training an enhancement machine learning model using the enhancement training data wherein training the enhancement machine learning model comprises preprocessing the enhancement training wherein preprocessing the enhancement training data comprises at least data cleaning;
    generating an additional process modification using the enhancement machine learning model; and
    generating the process enhancement as a function of the at least a process modification and the additional process modification.

12. The method of claim 11, wherein receiving user input comprises receiving the user input using a chatbot.

13. The method of claim 11 further comprising generating module training data.

14. The method of claim 13, further comprising adding the additional process modification to the module training data.

15. The method of claim 13, wherein identifying the at least a process modification comprises: generating module training data, wherein the module training data comprises correlations of process modules to process modifications;
  training a response module machine learning model using the module training data, wherein the response module machine learning model receives the modification target and process data as input and output at least a process modification; and
  determining the at least a process modification as a function of the response module machine learning model.

16. The method of claim 11, wherein the enhancement machine learning model is a neural network.

17. The method of claim 11, wherein the processor is further configured to add the process enhancement to the process data.

18. The method of claim 11, wherein the processor is configured to calculate an importance score as a function of a priority.

19. The method of claim 11, wherein determining the modification target comprises using a fuzzy set comparison.

20. The method of claim 11, wherein determining the modification target further comprises:
  calculating an importance score for each response module of the plurality of response modules; and
  determining the modification target as a function of the calculated importance scores.

* * * * *